United States Patent [19]

Ukai et al.

[11] Patent Number: 4,826,332
[45] Date of Patent: May 2, 1989

[54] PRINTER INCLUDING CARTRIDGE MOUNTED INTERCHANGEABLE READ ONLY MEMORY

[75] Inventors: Nobuyuki Ukai; Ryoji Shibata, both of Suwa, Japan

[73] Assignee: Seiko Epson Kabushiki Kaisha, Tokyo, Japan

[21] Appl. No.: 922,762

[22] Filed: Oct. 24, 1986

Related U.S. Application Data

[63] Continuation of Ser. No. 748,253, Jun. 24, 1985, abandoned.

[30] Foreign Application Priority Data

Jun. 25, 1984 [JP] Japan .................. 59-130677
Mar. 28, 1985 [JP] Japan .................. 60-64751

[51] Int. Cl.$^4$ .............................................. B41J 5/30
[52] U.S. Cl. .................................... 400/70; 400/61; 400/121; 400/692; 365/52; 365/63
[58] Field of Search ............. 400/61, 62, 70, 76, 400/88, 121, 171, 174, 175, 692; 365/52, 63, 105; 235/419; 307/154; 339/17 LC, 17 M, 17 CF

[56] References Cited

U.S. PATENT DOCUMENTS

| 3,631,536 | 12/1971 | Mosman | 365/63 X |
|---|---|---|---|
| 3,988,721 | 10/1976 | Fruitiger | 365/63 |
| 3,991,868 | 11/1976 | Robinson et al. | 400/124 |
| 4,058,195 | 11/1977 | Fravel et al. | 400/70 X |
| 4,058,707 | 11/1977 | Giolitti et al. | 235/419 X |
| 4,074,798 | 2/1978 | Berger | 400/174 X |
| 4,159,541 | 6/1979 | Ward et al. | 365/63 X |
| 4,213,177 | 7/1980 | Schmidt | 365/63 X |
| 4,320,980 | 3/1982 | Mia et al. | 400/70 |
| 4,353,653 | 10/1982 | Zimmerman | 400/70 |
| 4,360,728 | 11/1982 | Drexler | 346/76 L X |
| 4,379,606 | 4/1983 | Clark et al. | 339/17 LC X |
| 4,380,360 | 4/1983 | Parmer et al. | 339/17 LC X |
| 4,386,862 | 6/1983 | Kittel et al. | 400/175 X |
| 4,388,010 | 6/1983 | Mott et al. | 400/121 X |
| 4,397,511 | 8/1983 | Clark et al. | 339/17 LC X |
| 4,419,736 | 12/1983 | Christensen et al. | 364/900 |
| 4,426,166 | 1/1984 | Bowling | 400/62 |
| 4,660,998 | 4/1987 | Tsuneki | 400/70 X |
| 4,660,999 | 4/1987 | Tsuneki | 400/121 X |

FOREIGN PATENT DOCUMENTS

| 0035004 | 9/1981 | European Pat. Off. | 400/692 |
|---|---|---|---|
| 0042206 | 12/1981 | European Pat. Off. | 400/175 |
| 0072708 | 2/1983 | European Pat. Off. | |
| 0110632 | 6/1984 | European Pat. Off. | 400/61 |

OTHER PUBLICATIONS

IBM Technical Disclosure Bulletin, "Replaceable Logic Card Cartridge", Cox, vol. 24, No. 2, Jul. 1981, pp. 1068-1069.

IBM Technical Disclosure Bulletin, "Low Cost Cartridge Code Detector", Craft, vol. 25, No. 4, Sep. 1982, pp. 1980-1981.

IBM Technical Disclosure Bulletin, "Extension Device for a Personal Computer", vol. 27, No. 12, May 1985, pp. 6887-6890.

Primary Examiner—Ernest T. Wright, Jr.
Attorney, Agent, or Firm—Kaplan Blum

[57] ABSTRACT

A printer with a main body having a printing head, motors, a plurality of circuits driving the printing head and the motors, a processor and a random access memory. The printer also includes a cartridge for containing memory devices for storing the data for at least one character font set and for storing the printing operation control program. A connector removably connects the cartridge mechanically and electrically to the main body of the printer. As a result, the print operation control program and character font set data can be selectively set by connecting an appropriate cartridge to the main body of the printer.

25 Claims, 6 Drawing Sheets

PRINTER INCLUDING CARTRIDGE MOUNTED INTERCHANGEABLE READ ONLY MEMORY

This is a continuation of application Ser. No. 06/748,253, filed June 24, 1985, now abandoned.

BACKGROUND OF THE INVENTION

The invention is generally directed to a printer and in particular to a printer in which the print control functions and type fonts can be changed in accordance with the functioning of a computer or like apparatus (host machine).

The development of various types of computers has resulted in a vareity of methods of controlling a printer by the host computer. The methods differ from one another in, for example, the style of characters, symbols or dot patterns and horizontal or vertical print position control. As a result, it is often necessary to change the printer control program in order to use the printer with a host computer designed to operate utilizing a different control method.

Conventional printers contain a print head driving circuit, a carriage (CR) motor driving circuit, a line feed (LF) motor driving circuit, a microprocessing unit (MPU) for controlling the overall operation of the printer, a random access memory (RAM), a control read-only memory (ROM) for storing instruction data for the MPU and controlling the printer, a character read-only memory (ROM) for storing the printing characters and an interface for connecting the printer to the host computer. All of these components are traditionally mounted on one or more fixed circuit boards. A change in any of these circuits requires a change in the board or boards. This is a major and expensive change. Because of the complexity of the circuits utilized in the printer, the development and implementation of a new program for a printer is often time consuming and expensive.

As a result of these problems, it has also been necessary to utilize several different production lines to produce printers with different specifications adapted to various types of printing control methods. Consequently, there are often production lines which are not being fully utilized. The difficulties raised by the changes in the specifications for the printers has also caused a problem in inventory control. In particular, some printers with certain specifications which are in demand tend to sell well and are in short supply while printers with other specifications which are not in the same demand are overstocked.

Accordingly, there is a need to provide a printer which can have its specifications easily changed, thereby both simplifying the production process and reducing inventory control problems.

SUMMARY OF THE INVENTION

The invention is generally directed to a printer including a main body with a printing head, motors, a plurality of circuits for driving the printing head and the motors, a microprocessor unit and a random access memory. A cartridge contains memory devices for storing data associated with at least one character font set and for controlling the printing operation of the printer. A connector for removably connecting the cartridge mechanically and electrically to the main body of the printer is provided. As a result, the print operation control and character fonts can be selectively set by connecting an appropriate cartridge. Likewise, the print operation control and character fonts can be changed by connecting a different cartridge to the main body.

Accordingly, it is an object of the invention to provide an improved printer.

Another object of the invention is to provide an improved printer, the specifications of which can be easily changed.

A further object of the invention is to provide an improved printer which allows for the adaption of a single printer to a variety of host machines with different print operation control systems by storing the print operation control program and character font information on a removably attachable cartridge which fits into and is electrically coupled to the main body of the printer.

Still another object of the invention is to provide a printer with a removable cartridge for containing printing control and character ROMs which can be changed to suit different host machines to which the printer is connected.

Yet a further object of the invention is to provide an improved printer with a cartridge containing the character font information and print controller program so that a single production line can be provided for each type or model of printer, regardless of the difference in specification.

Still another object of the invention is to provide a printer with a removable cartridge for storing character font information and controlling the printing operation which also provides an interface with the host computer.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
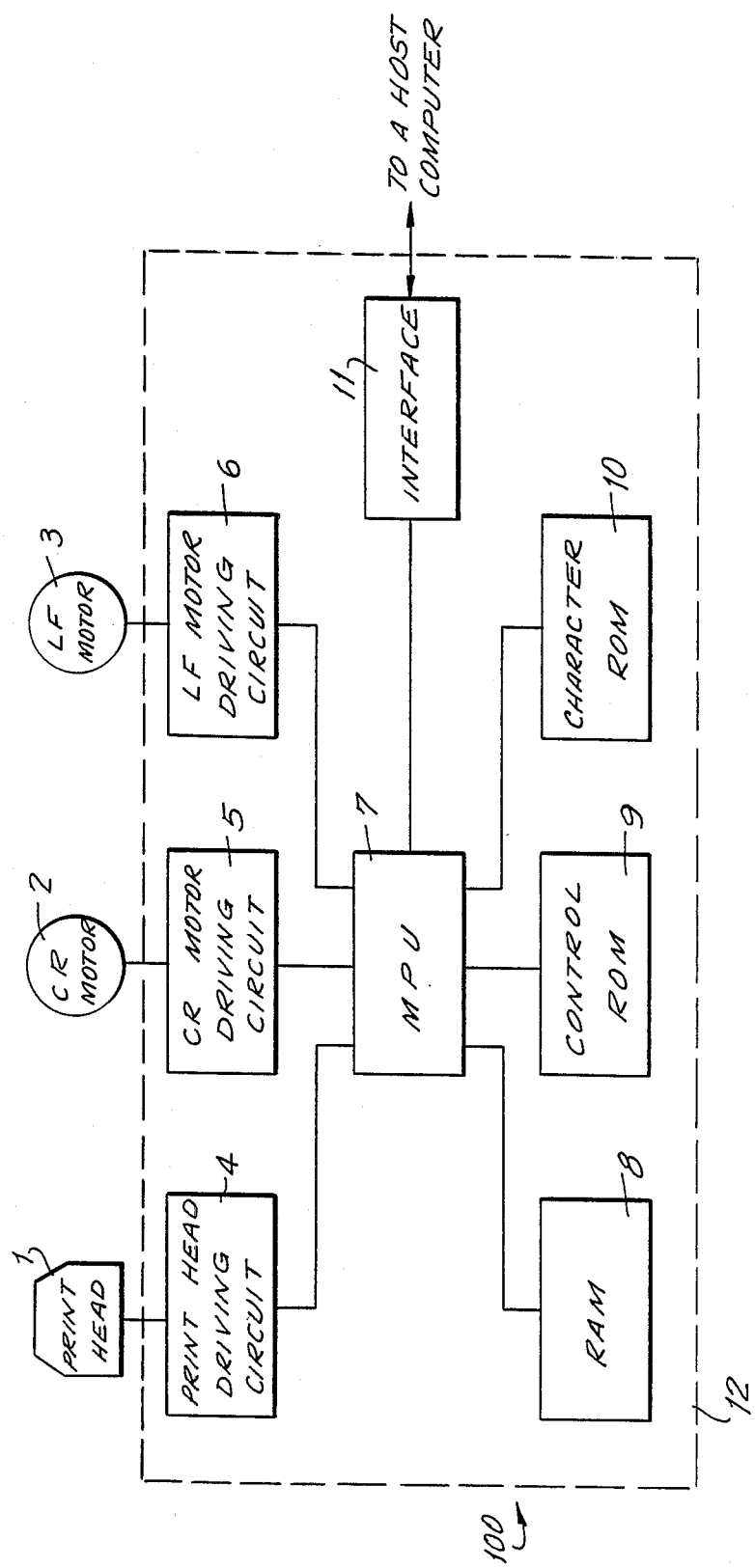
FIG. 1 is a block diagram of a conventional printer.

Reference is made to FIG. 1 wherein a conventional printer, generally indicated at 100 is depicted. Printer 100 includes a print head 1, a carriage motor (CR) 2, a line feed (LF) motor 3, a print head driving circuit 4, a CR driving circuit 5, a LF driving circuit 6, a microprocessor unit (MPU) 7 for controlling the overall operation of the printer 100, a random access memory (RAM) 8, a control read-only memory (ROM) 9 for storing instruction data for the MPU 7 and controlling the printer 100, a character read-only memory (ROM) 10 for storing the printing character data and an interface 11 for connecting the printer 100 with a host computer (not shown). The various components are mounted on one or more fixed circuit boards 12. Any change in the circuits requires a change in the board or boards 12. This is a large and expensive change and the circuits are so complex that considerable time and expense is involved in developing a new program.

Figure 2:
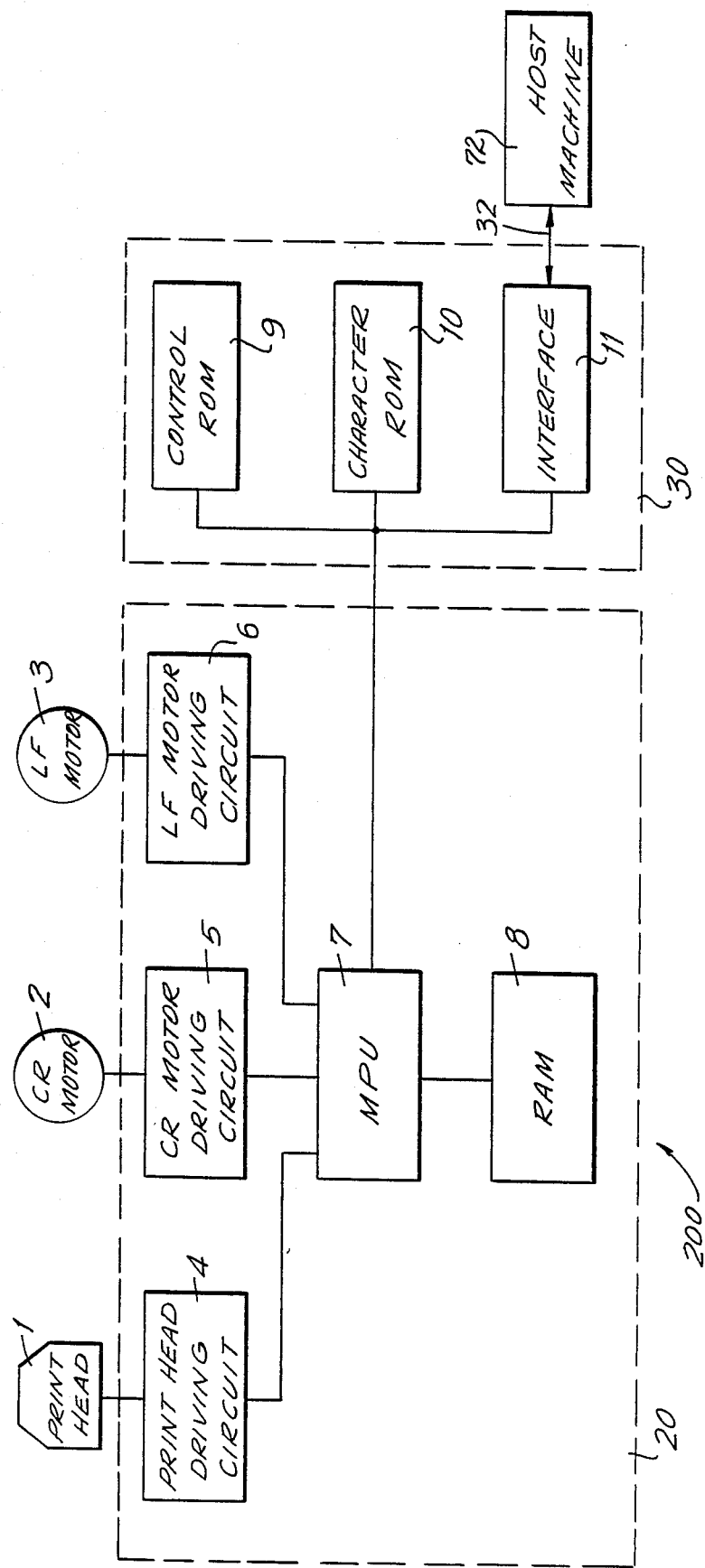
FIG. 2 is a block diagram of a printer constructed in accordance with the instant invention.

Reference is next made to FIG. 2 wherein a printer, generally indicated as 200 constructed in accordance with a preferred embodiment of the invention is depicted. Printer 200 includes a circuit board 30 in a cartridge 31 (FIG. 3) which is separate from a circuit board 20 located in the main body 40 (FIG. 4) of printer 200. Board 20 includes a print head driving circuit 4 for driving print head 1, a CR motor driving circuit 5 for controlling the operation of CR motor 2 and a LF motor driving circuit 6 for controlling the operation of LF motor 3. Main body board 20 also contains a microprocessor unit (MPU) 7 and a random access memory (RAM) 8. The elements on board 20 as well as print head 1, CR motor 2 and LF motor 3 are contained in the main body of the printer 200 (FIG. 4).

Board 30 includes a control read-only memory (ROM) 9 for storing the order by which print head driving circuit 4, CR motor driving circuit 5 and LF motor driving circuit 6 are controlled. A character ROM 10 stores a variety of patterns of character styles in various fonts. An interface 11, such as the RS232C interface is also present in cartridge board 30 and is used to connect the cartridge 31 to the host machine 72 with a plurality of electrical lines 32 (FIG. 3).

Control and character ROMs 9 and 10 can be configured as either a single ROM or as two separate ROMs. If two separate ROMs are used it is often necessary to provide a circuit to select between the appropriate ROMs at different times during the printing process. Character ROM 10 is not limited to a single character font, but may store a plurality of fonts such as Ming, Gothic, and Boldface types.

Interface 11 is not limited to the RS 232C standard but may be adapted for different specifications, such IEEE 488 or GP-IV. It is also possible for interface 11 to be configured as a serial or parallel interface.

Figure 3:
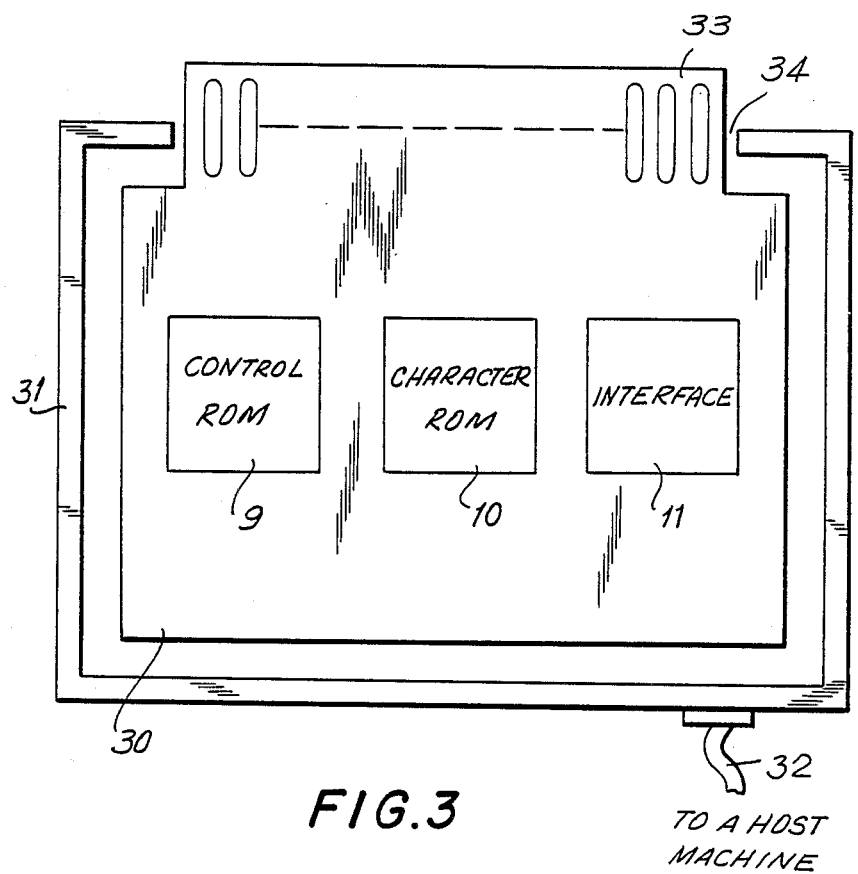
FIG. 3 is a schematic view of a cartridge used in the printer constructed in accordance with the invention.
Figure 4:
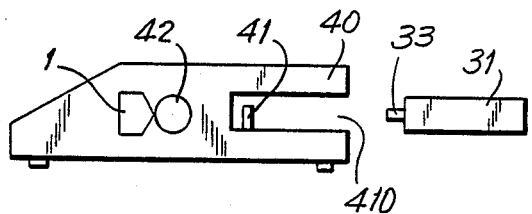
FIG. 4 is an exploded schematic view of a printer constructed in accordance with the invention showing the cartridge in a position to be connected to the main body of the printer.

Reference is made to FIGS. 3 and 4 wherein the manner in which cartridge 31 is connected to main body 40 of printer 200 is depicted. Board 30 has a connector 33 which connects to the main body 40 (FIG. 4) of the printer 200. Cartridge 31 has an opening 34 through which connector 33 projects. Main body 40 has a cartridge support 41 adapted to receive cartridge 31 or a portion thereof. Cartridge support 41 engages with connector 33. Although FIG. 4 shows cartridge support 41 and opening 410 in the rear of printer main body 40, the opening 410 and support 41 can also be positioned at the front, sides, top or bottom of the main body 40. FIG. 4 also schematically depicts print head 1 and a platen 42.

Figure 5:
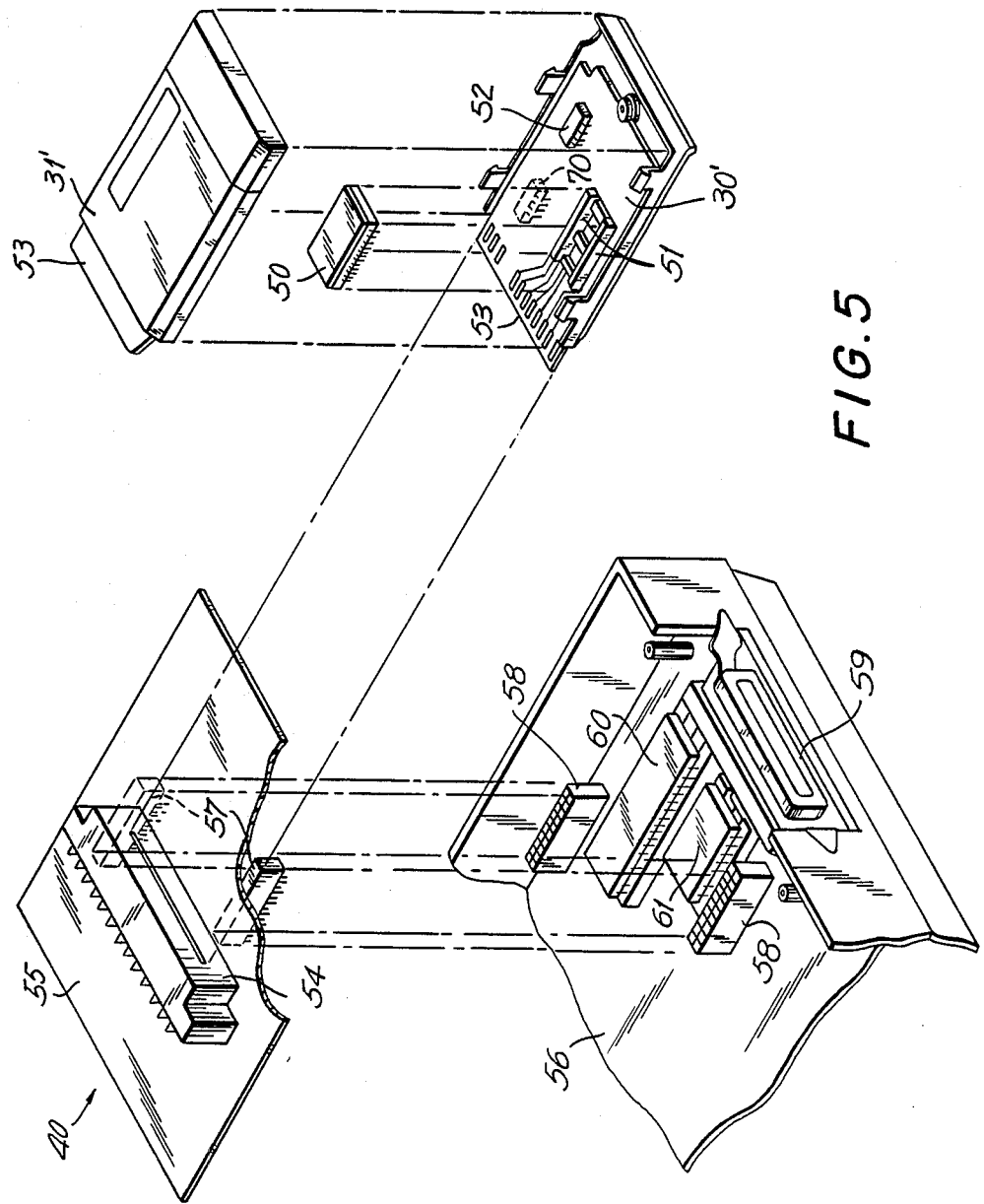
FIG. 5 is an exploded, partially cut-away perspective view of the manner in which a cartridge is connected to the main body of a printer constructed in accordance with another embodiment of the invention.

Reference is next made to FIG. 5 wherein another embodiment of the cartridge-printer connection constructed in accordance with the invention is depicted. A ROM 50 for storing both a print control program and at least one character font is connected to board 30' by an IC socket 51. Board 30' also includes an IC 52 for reading ROM 50. Board 30 has a male connector 53 which is adapted to engage with a female connector 54 on the main body 40 of the printer 200 to provide both a mechanical and electrical connection between cartridge 31' and main body 40 of the printer 200. Main body 40 has an upper support base 55 and a lower base 56 below upper base 55 for supporting cartridge 31'. Bases 55 and 56 are connected to each other by male and female connectors 57 and 58 extending therebetween and adapted to engage each other. Main body 40 is also provided with a connector 59 for an external interface. Two ICs 60 and 61 are also provided on base 56. ICs 60 and 61 may be used to implement the external interface or for other purposes.

In the device of FIG. 5 the interface is connected to the main body 40 of the printer 200 instead of being located in cartridge 31'. This arrangement leaves space empty on board 30' and allows for the addition of a RAM chip 70 shown in dashed lines in FIG. 5 to board 30' if additional random access memory is required. This arrangement also contributes to a considerable reduction in size of cartridge 31' as compared to the situation in which a parallel interface is located in the cartridge 31.

Figure 6:
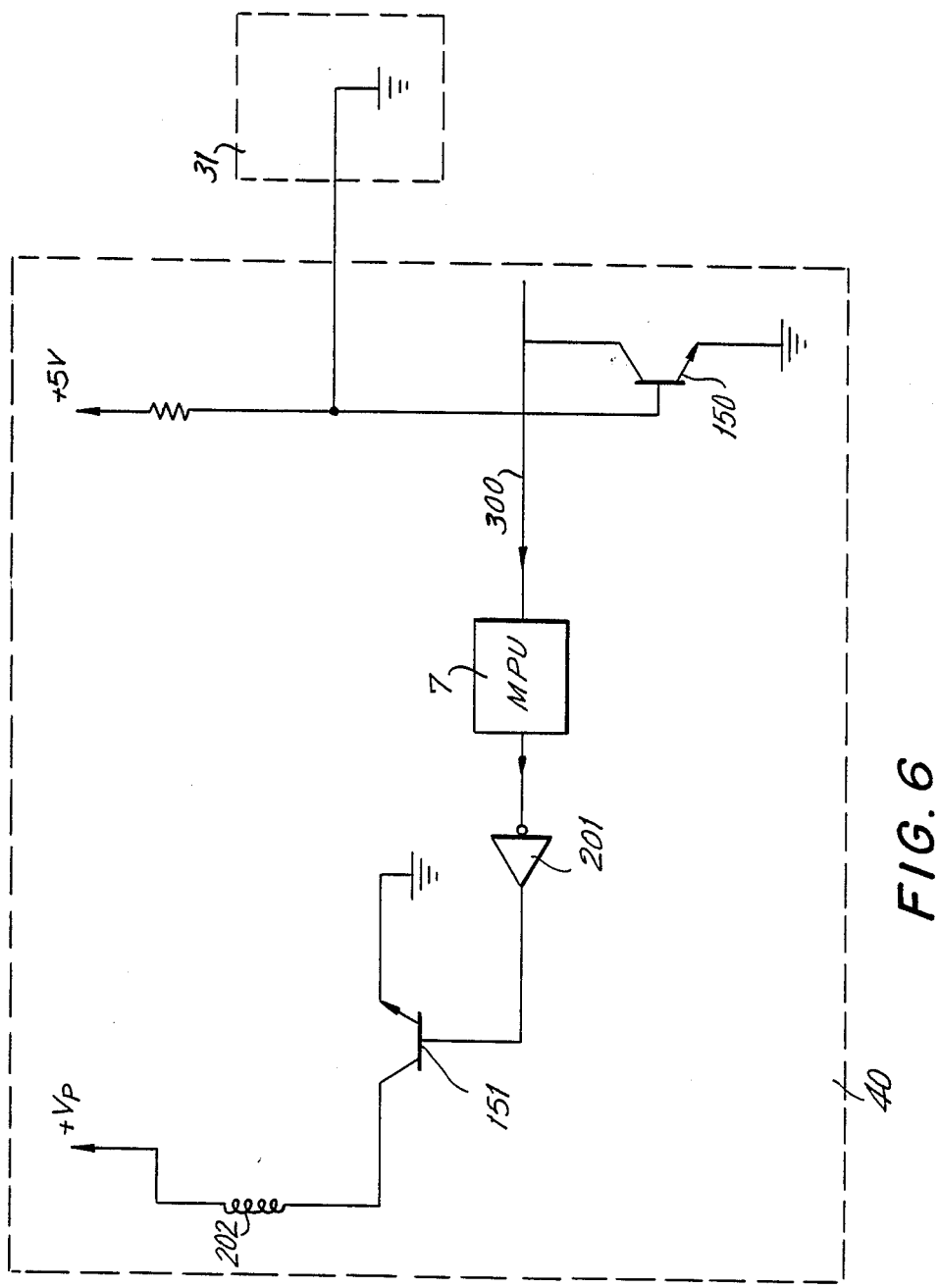
FIG. 6 is a schematic circuit diagram showing the electrical connections between the cartridge and the main body of the printer constructed in accordance with the invention.

Reference is next made to FIG. 6 wherein a circuit diagram for the electrical connection of cartridge 31 to main body 40 is depicted. Before cartridge 31 is connected to main body 40, a transistor 150 is ON and a reset signal 300 is maintained in a low state. Reset signal 300 is transmitted to MPU 7 and the output terminal of MPU 7 is in its high or high impedance state. As a result, the output of inverter 201 is low and a transistor 151 is OFF which prevents current flow through coil 202. In other words, MPU 7 is in its reset position before cartridge 31 is connected to main body 40.

If cartridge 31 is connected to main body 40 an electric current flows to ground through cartridge 31. As a result, transistor 150 is turned OFF and reset signal 300 is high. MPU 7 is released from its reset position and has a low output. Consequently, the output of inverter 201 is high and transistor 151 is turned ON thereby allowing current to flow through coil 202.

If cartridge 31 is disconnected from main body 40 during the printing operation, i.e., when an electric current is being supplied to a coil 202 in the print head, reset signal 300 reverts to a low state and the output terminals of MPU 7 returns to the high or high impedance state. As a result, the output of inverter 201 is low and transistor 151 is turned OFF. The result is that current can no longer flow through transistor 151 to ground and the electric current through coil 202 is prevented from flowing. This protects coil 202 from overheating.

Figure 7:
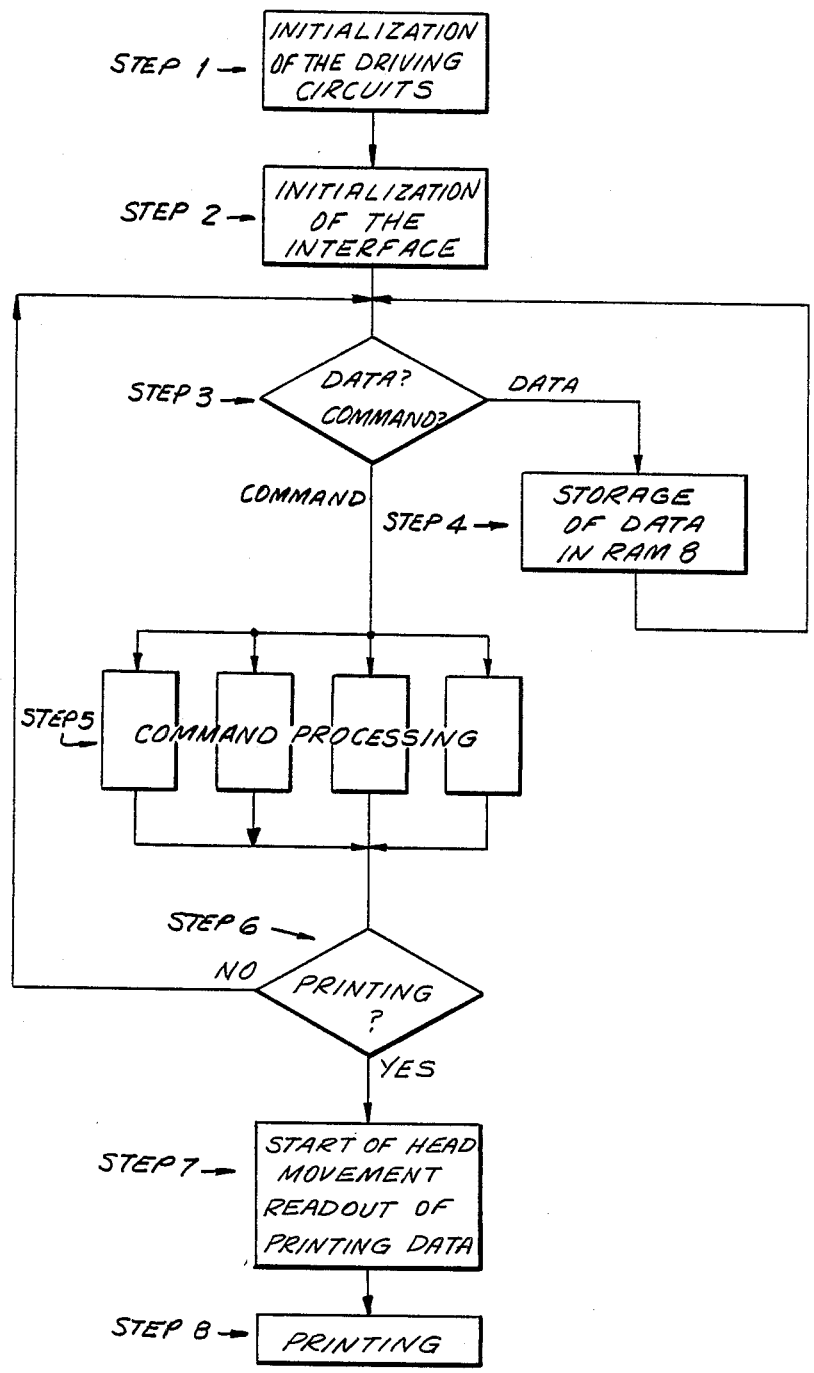
FIG. 7 is a flow-chart diagram depicting the operation of the printer constructed in accordance with the invention.

Reference is next made to FIG. 7 wherein a flow chart diagram of the operation of a printer 200 constructed in accordance with the invention is depicted. When a power source for the printer 200 is turned ON, control ROM 9 in the cartridge 31 is read by MPU 7 and print head driving circuit 4, CR motor driving circuit 5, LF motor driving circuit 6, MPU 7 and RAM 8 are initialized in accordance with the order stored in ROM 9 as shown in step 1. Next, interface 11 is initialized as shown in step 2 to enable a host computer (not shown) to start the transmission of command or printing data to the printer 200. The printer 200 determines if the information from the host machine 72 is a data or a command transmission (step 3). If the transmission is in the form of data, the data is stored in RAM 8 as shown in step 4. Next, the printer 200 returns to step 3 to determine what form the next transmission from the host machine 72 takes.

If the transmission from the host machine 72 is determined in step 3 to be a command, the command is accordingly processed in step 5. In step 6 a determination is made whether the command is a printing or nonprinting command. If the command is a nonprinting command, control returns to step 3. However, if the command is a printing command, head movement and read out of printing data in step 7 and printing in step 8 commences.

If the printing data, for example, is composed of characters, a specified character pattern is read out of character ROM 10 and MPU 7 controls CR motor 5 to start moving print head 1. When print head 1 passes each specified position, print head driving circuit 4 operates to cause printing head 1 to effect printing (step 8).

The various operating steps described are carried out in accordance with the order contained in control ROM 9. Control ROM 9, character ROM 10 and interface 11 are all designed specifically to suit the host machine 72 in which the printer 200 is connected. A laser card, or a card punched by a laser can be used for each of ROMs 9 and 10. A laser card can store a far larger amount of data than a semiconductor memory.

Accordingly, as described above, the specifications of a printer 200 can be changed to suit a host machine 72 by merely changing a cartridge 31. The main body of the printer 200 is adaptable for use with a wide variety of host computers without any need for a change in the configuration or specification of the printer 200. Rather, the only change necessary is a removal of one cartridge 31 and the insertion of another cartridge 31. This allows for reductions in the cost of production and time for development of a printer 200 suitable for use with a new host computer. In addition, the necessary changes in the specifications of a particular printer 200 can be achieved by using different cartridges 31 for different host computers. The various cartridges 31 have different print control programs adapted for the print control systems used by different host machines 72. As a result, a printer 200 constructed in accordance with the present invention can be made suitable for a working environment in which a wide variety of host computers are to be connected to a single printer 200. A user could purchase a single printer 200 with several cartridges 31 for use with various host machines 72.

In addition, increases in efficiency in the production line are achieved by constructing printers 200 in accordance with the invention. A single production line for the main bodies of the printers 200 can be common for printers 200 suitable for use with a wide variety of host computers. The only separation in production is in the production of the cartridges 31 for use in host computers with different print control systems.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A printer comprising:
   a main body including a printing head, at least one motor, a plurality of circuits for driving the printing head and the at least one motor, processing means and a random access memory;
   a cartridge for containing memory means for storing data associated with at least one character font set and a printing operation control program and further including interface means for connecting the printer to a host machine;
   and means for removably connecting the cartridge mechanically and electrically to the main body;
   whereby the printing operation control program and character font sets can be selectively set by connecting an appropriate cartridge.

2. The printer of claim 1 wherein the memory means includes at least one read-only memory device for storing the character font set data and printing operation control program.

3. The printer of claim 1 wherein the memory means includes one read-only memory device for storing the character font set data and a second read-only memory device for storing the printing operation control program.

4. The printer of claim 3 further including circuit means for selecting one of the two ROMs.

5. The printer of claim 1 wherein the means for removably connecting the cartridge includes a set of male and female connectors, one of the set being provided on the cartridge and the other on the main body.

6. The printer of claim 5 wherein the main body includes a cavity adapted to receive the cartridge therein.

7. The printer of claim 2 wherein the read-only memory device is a laser card.

8. The printer of claim 2 wherein the read-only memory device for storing character font data and the read-only memory device for storing the printing operation control program are laser cards.

9. The printer of claim 1 further including a random access memory device in the cartridge for providing the printer with additional random access memory.

10. The printer of claim 1 wherein the interface means is a RS232C interface.

11. The printer of claim 1 wherein the memory means includes means for storing the data for a plurality of character font sets.

12. The printer of claim 1 wherein the printing head includes a coil and the means for removably connecting the cartridge mechanically and electrically to the main body includes first circuit means in the cartridge and second circuit means in the main body of the printer for electrically coupling with the first circuit means when the cartridge is coupled to the main body, and for preventing current from flowing through the coil when the cartridge is disconnected from the main body.

13. The printer of claim 12 wherein the first circuit means includes a ground and a connector coupled to ground and said second circuit means includes switching means, coupled to the connector of said first circuit means when the cartridge is connected to the main body and uncoupled from the first circuit means when the cartridge is removed from the main body, for providing an enabling or a disabling output and coil switch means for allowing current to flow through the coil when said enabling output is produced and for preventing current from flowing in the coil when the disabling output is reduced.

14. The printer of claim 13 wherein the coil switch means includes a transistor having a source and drain path coupled in series between the coil and ground, a gate electrode of said transistor being coupled to the output of said second circuit means.

15. The printer of claim 1 wherein the means for removably connecting the cartridge includes a set of male and female connectors, one of the set being provided on the cartridge and the other on the main body.

16. In a printer including a printing head, a circuit for driving the printing head, a carriage motor, a circuit for driving a carriage motor, a line feed motor, a circuit for driving the line feed motor, a microprocessor unit operationally connected to the circuits for driving the printing head, carriage motor and line feed motor, a character read-only memory device operationally connected to the microprocessor unit for specifying a style of characters , a control read-only memory device operationally connected to the microprocessor unit for controlling the printing operation and an interface for connecting the printer to a host machine, the improvement comprising: a cartridge supporting the control and character read-only memory devices and interface, a main body of the printer being defined as the printing head, carriage motor, line feed motor, circuits for driving the printing head, carriage motor and line feed motor and the microprocessing unit, the cartridge and memory devices and interface supported thereby being removably coupled to the main body of the printer.

17. A printer comprising:
a main body including a printing head, at least one motor, a plurality of circuits for driving the printing head and the at least one motor, processing means and a random access memory;
a cartridge for containing memory means for storing data associated with at least one character font set and interface means for connecting the printer to a host machine;
and means for removably connecting the cartridge mechanically and electrically to the main body;
whereby the character font sets and interface means can be selectively set by connecting an appropriate cartridge.

18. The printer of claim 17 wherein the main body further includes a printing operation control program.

19. The printer of claim 17 wherein the memory means includes at least one read-only memory device for storing the character font set data.

20. The printer of claim 17 further including a random access memory device in the cartridge for providing the printer with additional random access memory.

21. A printer comprising:
a main body including a printing head, at least one motor, a plurality of circuits for driving the printing head and the at least one motor, processing means and a random access memory;
a cartridge for containing a printing operation control program and interface means for connecting the printer to a host machine;
and means for removably connecting the cartridge mechanically and electrically to the main body;
whereby the printing operation control program and interface means can be selectively set by connecting an appropriate cartridge.

22. The printer of claim 21 wherein the main body further includes memory means for storing data associated with at least one character font set .

23. The printer of claim 21 wherein the memory means includes at least one read-only memory device for storing the printing operation control program.

24. The printer of claim 21 wherein the means for removably connecting the cartridge includes a set of male and female connectors, one of the set being provided on the cartridge and the other on the main body.

25. The printer of claim 21 further including a random access memory device in the cartridge for providing the printer with additional random access memory.

* * * * *